US005169404A

United States Patent [19]

Bühler et al.

[11] Patent Number: 5,169,404

[45] Date of Patent: Dec. 8, 1992

[54] MONOAZO DYESTUFFS FOR THE SUBLIMATION TRANSFER PROCESS

[75] Inventors: Ulrich Bühler, Alzenau; Erika Kunz, Hanau; Josef Ritter, Schwalbach, all of Fed. Rep. of Germany

[73] Assignee: Cassella AG, Frankfurt am Main, Fed. Rep. of Germany

[21] Appl. No.: 658,761

[22] Filed: Feb. 21, 1991

[30] Foreign Application Priority Data

Feb. 26, 1990 [DE] Fed. Rep. of Germany ....... 4005939

[51] Int. Cl.[5] .......................... D06P 5/13; B41M 5/26; C09B 29/08; C09B 43/42

[52] U.S. Cl. ........................................... 8/471; 8/467; 8/512; 8/662; 8/696; 503/227; 534/573

[58] Field of Search ............................ 8/471; 503/227

[56] References Cited

U.S. PATENT DOCUMENTS

| | | | |
|---|---|---|---|
| 4,582,509 | 4/1986 | Buhler et al. | 8/532 |
| 4,695,288 | 9/1987 | Ducharme | 8/471 |
| 4,760,049 | 7/1988 | Etzbach et al. | 503/227 |
| 4,764,177 | 8/1988 | Sumi et al. | 8/471 |
| 4,764,178 | 8/1988 | Gregory et al. | 8/471 |

FOREIGN PATENT DOCUMENTS

| | | |
|---|---|---|
| 235939 | 9/1987 | European Pat. Off. . |
| 2030167 | 4/1980 | United Kingdom . |

*Primary Examiner*—A. Lionel Clingman
*Attorney, Agent, or Firm*—Connolly and Hutz

[57] ABSTRACT

Use of water-insoluble monoazo dyestuffs of the formula I

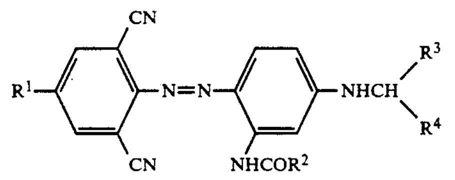

(I)

wherein $R^1$ denotes alkyl having 1 to 6 C atoms, cyclopentyl, cyclohexyl, fluorine, chlorine, bromine, alkoxy having 1 to 4 C atoms or trifluoromethyl, $R^2$ denotes alkyl having 1 to 7 C atoms and $R^3$ and $R^4$ independently of one another denote alkyl having 1 to 4 C atoms, for the sublimation transfer process.

10 Claims, No Drawings

MONOAZO DYESTUFFS FOR THE SUBLIMATION TRANSFER PROCESS

The invention relates to the use of dyestuffs of a certain structure for the sublimation transfer process. Some of the dyestuffs used are new and are claimed, together with the process for their preparation, in the context of the present invention. The invention furthermore relates to a dyestuff carrier for the sublimation transfer process, a process for its preparation and a process for the transfer of dyestuffs.

Outstanding colour images can be produced, for example on paper coated with plastic or on films of plastic, with the aid of the sublimation transfer process after image information supplied by electronic image sources, such as video cameras or video recorders, by television screens or computers or electronic still cameras and the like. The electronic image information is processed in facsimile apparatuses, copying apparatuses or printers which contain a thermal printhead with numerous tiny (for example 4 to 16 per mm) heating elements arranged in a row. Digital image information is converted into various heat levels in the thermal printhead and fed to the individual heating elements. The heating elements press onto the reverse of a dyestuff carrier, for example a coloured ribbon which has on its front side a colour layer comprising blocks, in succession in the coloured ribbon direction, each containing a dyestuff of the subtractive primary colours yellow, magenta and cyan and if appropriate also black. The front side of the coloured ribbon lies with the colour layer on the recording material onto which the colour image is to be produced. A proportional amount of dyestuff is released from the dyestuff layer, according to the heat energy supplied to the heating elements, and is transferred onto the recording material. The coloured ribbon and recording material are moved past the thermal printhead. During this operation, an image is first transmitted in line form in a primary colour. The complete colour spectrum of the image is then produced by sequential transfer of the two other primary colours and if appropriate additionally of black.

The heat pulses generated by the heating elements lie in the millisecond range It is generally assumed that the dyestuff is transferred from the coloured ribbon to the recording material by sublimation, but elsewhere other mechanisms of dyestuff transfer, for example dyestuff vaporisation or dyestuff diffusion, are also assumed. As well as the term sublimation transfer process, other terms are also in use, such as dyestuff diffusion thermotransfer process and thermotransfer printing process. Numerous modifications of the principle described for the sublimation transfer process are of course possible. Thus, for example, the coloured ribbon carrying the three or four colour areas of the primary colours arranged in succession can be replaced by three or four colour carriers each carrying a primary colour of yellow, magenta, cyan and if appropriate black.

The gradation of the colours on the finished recording in the sublimation transfer process is influenced in a simple manner by controlling the heat energy released by the heating elements, by which the amount of dyestuff sublimed off and transferred onto the recording material is adjusted Because the colour gradations are easy to control in this way, the sublimation transfer process has advantages over other colour transfer processes. On the other hand, however, only those dyestuffs which meet the particular requirements of this process are suitable for the sublimation transfer process. These requirements include above all the requirement that the dyestuff can easily be sublimed or vaporised in non-decomposed form under the operating conditions of the sublimation transfer process, that is to say within fractions of a second, in order to ensure adequate transfer onto the recording material In textile transfer printing, a paper is first printed with a multi-coloured design on a paper-printing machine. This design is then transfer-printed onto a suitable textile material, usually polyester, by the action of temperatures of 180° to 230° C. over its area on presses or transfer printing calenders. In contrast to the above-mentioned sublimation transfer process for the production of coloured recordings, the heating times are considerably longer in textile transfer printing and are usually in the range from 20 to 60 seconds These circumstances and other differences between textile transfer printing and the sublimation transfer process mean that the dyestuffs which can be used for textile transfer printing are usually unsuitable, or are not suitable in an optimum manner, for the sublimation transfer process.

A dyestuff which is suitable for the sublimation transfer process should have, for example, the following properties: it should be transferable in non-decomposed form onto the recording material in a arrow temperature range within a few milliseconds; its resublimation from the recording material should be as low as possible; its image stability in the recording material should be long and high, and in particular the image should be stable towards the action of light, moisture, chemicals, heat, rubbing and scratches and other environmental influences; it must have a primary colour shade suitable for three- or four-colour printing and its molecular extinction coefficient should be high; and it should be readily soluble in organic solvents and produce uniform recordings. The dyestuff should moreover be non-toxic and easy to prepare, and readily processible to give a printing ink.

The dyestuffs which have been disclosed for the sublimation transfer process, for example C.I. Disperse Red 60 and the dyestuffs of U.S. Pat. No. 4,695,288, 4,764,178, DE-OS 36 38 756 and DE-OS 38 01 545, do not yet adequately meet the requirements imposed by the sublimation transfer process.

The invention was based on the object of providing dyestuffs which are outstandingly suitable for the sublimation transfer process in which dyestuffs are transferred from a carrier onto a recording material by a brief local supply of heat.

The invention relates to the use of water-insoluble monoazo dyestuffs of the general formula I in the sublimation transfer process

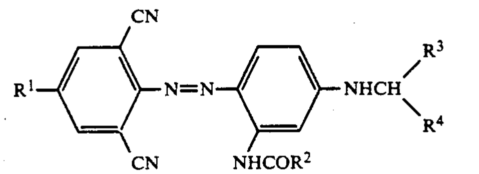

(I)

wherein $R^1$ denotes alkyl having 1 to 6 C atoms, cyclopentyl, cyclohexyl, fluorine, chlorine, bromine, alkoxy having 1 to 4 C atoms or trifluoromethyl, $R^2$ denotes alkyl having 1 to 7 C atoms and $R^3$ and $R^4$ independently of one another denote alkyl having 1 to 4 C atoms.

The dyestuffs of the formula I used according to the invention in the sublimation transfer process can be used by themselves, as a mixture with one another or as a mixture with other dyestuffs.

The dyestuffs of the formula I in which $R^2$ denotes alkyl having 4 to 7 C atoms are new and are claimed, together with a process for their preparation, in the context of the present invention.

The alkyl and alkoxy radicals can be straight-chain or branched.

Alkyl radicals having 1 to 6 C atoms which can be represented by $R^1$ in formula I are, for example, methyl, ethyl, propyl, i-propyl, n-butyl, i-butyl, sec-butyl, tert-butyl, n-pentyl, i-pentyl and n-hexyl.

Alkoxy radicals having 1 to 4 C atoms which can be represented by $R^1$ in formula I are, for example, methoxy, ethoxy, n-propoxy, i-propoxy, n-butoxy, i-butoxy, sec-butoxy and tertbutoxy.

Alkyl radicals having 1 to 7 C atoms which can be represented by $R^1$ in formula I are, for example methyl, ethyl, n-propyl, i-propyl, n-butyl, 2-butyl, 2-methylpropyl, n-pentyl, 2-pentyl, 3-pentyl, n-hexyl, n-heptyl, 3-heptyl and 4-heptyl.

Alkyl radicals having 1 to 4 C atoms which can be represented by $R^3$ and $R^4$ in formula I are: methyl, ethyl, n-propyl, i-propyl, n-butyl, i-butyl, sec-butyl and tert-butyl.

Preferred radicals for $R^1$ are alkyl radicals having 1 to 3 C atoms, alkoxy radicals having 1 to 3 C atoms and, in particular, chlorine and bromine. Preferred radicals $R^1$ are accordingly: methyl, ethyl, n-propyl, i-propyl, methoxy, ethoxy, n-propoxy, i-propoxy and, in particular, chlorine and bromine The alkyl radicals represented by $R^2$ preferably have 2 to 6 C atoms. Examples of such preferred alkyl radicals represented by $R^2$ are ethyl, n-pentyl, 2-pentyl, 3-pentyl, n-hexyl and, in particular, n-propyl, i-propyl, n-butyl, 2-butyl and 2-methylpropyl. The alkyl radicals represented by $R^2$ especially preferably have 3 or 4 C atoms.

Methyl or ethyl is preferred for $R^3$.

The radicals $R^3$ and $R^4$ are preferably chosen so that the sum of the carbon atoms in the radicals $R^3$ and $R^4$ is 3, 4, 5 or 6, in particular 3 or 4.

If $R^1$ denotes an alkyl or alkoxy radical, the sum of the carbon atoms in the radicals $R^1$, $R^2$, $R^3$ and $R^4$ is preferably 6 to 11. If $R^1$ denotes fluorine, chlorine, bromine or trifluoromethyl, the sum of the carbon atoms in the alkyl radicals represented by $R^2$, $R^3$ and $R^4$ is preferably 5 to 10.

Dyestuffs which are preferably to be employed for the use according to the invention are those having preferred meanings of $R^1$, $R^2$, $R^3$ and $R^4$.

The individual dyestuffs of the formula I are prepared by a process in which azo dyestuffs of the formula II

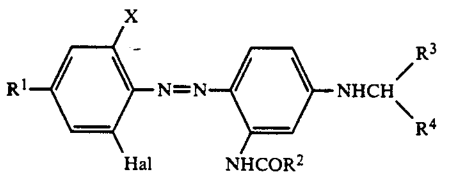

(II)

in which $R^1$, $R^2$, $R^3$ and $R^4$ have the above meanings, X denotes cyano or halogen and Hal denotes a halogen atom, such as chlorine or, in particular, bromine, are subjected to a nucleophilic replacement reaction in a manner which is known per se, for example in accordance with the information in DOS 1,809,920 and 1,809,921, GB Patent Specifications 1,184,825 or 1,125,685, DAS 1,544,563, DOS 2,310,745, DAS 2,456,495, DAS 2,610,675, DOS 2,724,116, DOS 2,724,117, DOS 2,834,137, DOS 2,341,109, US Patent Specif. No. 3,821,195, DOS 2,715,034 or DOS 2,134,896, the cyanide ion CN. being employed as the nucleophilic agent.

Solvents which are used for the replacement reaction are inert organic solvents, such as, for example, nitrobenzene, glycol monomethyl ether, diglycol monomethyl ether or diglycol monoethyl ether or mixtures of such solvents with one another and with tertiary organic nitrogen bases, dipolar aprotic solvents, such as, for example, methylpyrrolidone, pyridine, dimethylformamide or dimethyl sulphoxide, dicyanodialkyl thioethers, water or aqueous systems consisting of water and a water-immiscible organic solvent (such as, for example, nitrobenzene), preferably in the presence of a wetting or dispersing agent or a known phase transfer catalyst, or aqueous systems of water and a water-soluble inert organic solvent, such as, for example, ethylene glycol or dimethylformamide.

The presence of organic basic nitrogen compounds, such as, for example, pyridine and pyridine bases, also has a favourable action on the replacement reaction.

The reaction temperatures are usually between 20° and 150° C.

The nucleophilic agent $CN^-$ is added to the reaction in the form of a metal cyanide, in complex form if appropriate, such as, for example, an alkali metal or alkaline earth metal cyanide, zinc cyanide or an alkali metal cyanozincate or -ferrate, but preferably in the form of copper(I) cyanide or in the form of a system which forms copper(I) cyanide. The use of a combination of alkali metal cyanide with copper(I) cyanide has proved to be particularly suitable, it being possible for the weight ratio of alkali metal salt and copper salt to be varied within wide limits. The customary range of the weight ratio of alkali metal cyanide/copper(I) cyanide is 5 : 95 to 95 : 5. The positive mutual influencing of the components is also still detectable outside these limits. It is of course also possible for the copper(I) cyanide in turn to be replaced by a system which forms copper(I) cyanide, such as, for example, a combination of an alkali metal cyanide with another copper salt, preferably a copper(I) salt, such as, for example, a copper(I) halide.

The dyestuffs of the formula II required for the preparation of the dyestuffs of the formula I can be prepared by a process in which a diazonium compound of an aromatic amine of the general formula III

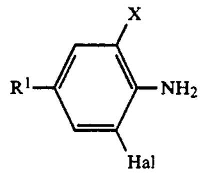

(III)

is coupled with a coupling component of the general formula IV

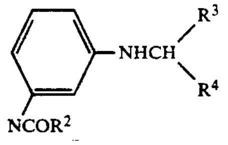
(IV)

wherein $R^1$, $R^2$, $R^3$, $R^4$, X and Hal have the meanings already given.

Solutions of diazonium compounds are obtained from the amines of the general formula II in a manner which is known per se by the action of nitrous acid or other systems which form nitrosonium ions, in an acid aqueous medium, a lower alkanecarboxylic acid, such as, for example, formic acid, acetic acid or propionic acid or mixtures thereof, or an organic solvent at temperatures of 0° to 40° C.

Coupling is likewise carried out in a manner which is known per se by combining the resulting solution of the diazonium compound with a solution of the coupling component at temperatures of 0° to 40° C., preferably 0° to 25° such as, for example, an alkanol having 1 to 4 C atoms or dimethylformamide, preferably in water acidified with sulphuric acid, hydrochloric acid or phosphoric acid, or an optionally aqueous lower alkanecarboxylic acid or a lower alkanecarboxylic acid mixture, if appropriate also in the presence of an alkanol of limited water-miscibility. In some cases, it may be appropriate to buffer the pH during the coupling, for example by addition of sodium acetate. The coupling is complete after a few hours, and the dyestuff of the formula I can be isolated and dried in the customary manner.

The starting compounds of the general formulae II and III required can be prepared from known commercial products by known processes.

The dyestuffs of the formula I used according to the invention for the sublimation transfer process are distinguished from the dyestuffs used to date for this purpose, for example, by the following advantages in particular: better and similar sublimation capacity, higher lightfastnesses, higher solubilities in organic solvents, such as, for example, in MEK (methyl ethyl ketone) and toluene, and lower resublimation from the recording material.

The dyestuff carriers required for transfer of the dyestuffs in the sublimation transfer process are prepared in a manner which is known per se. The dyestuff of the formula I used is processed to a printing ink, if appropriate as a mixture with one or more other dyestuffs of the formula I and/or in a mixture with one or more other dyestuffs, together with a binder or thickener, for example in water or in an organic solvent. Suitable organic solvents are, for example, methyl ethyl ketone, toluene, butano or chlorobenzene. The printing ink can contain the dyestuff in dispersed and/or preferably in dissolved form. In the case of a dispersed dyestuff, its particle size is advantageously equal to or less than 1 μm. Examples of suitable binders or thickeners are: methyl- or ethylcellulose, polymers of acrylic acid and methacrylic acid, polystyrene, polycarbonates, polysulphones, polyether-sulphones, polyester resins and the like. The printing ink is then applied to an inert carrier, for example on a coating machine or using a doctor blade, in the layer thickness used, for example 3 to 7 μm, and is subsequently dried. After drying, the thickness of the dyestuff layer can be, for example, 0.1 to 5 μm. Suitable inert carrier materials consist, for example, of paper, such as capacitor paper, tissue paper or art paper, or of plastic. Films of plastic made of polyester, such as, for example olyethylene terephthalate, polyamide, polyimide or polyaramid, for example, are suitable. The carrier material can have a thickness of, for example, 3 to 50 μm and must be impermeable, and should have a high thermal conductivity. In addition to the constituents already mentioned, the printing ink can also contain further constituents, such as, for example, dispersing agents, antioxidants and/or viscosity regulators and the like. If appropriate, the dyestuff carrier also contains other layers in a known manner, for example on the reverse of a heat-stable sliding layer for improving the running properties and heat resistance to the heating elements of the thermal printhead.

Suitable recording materials are films of heat-stable plastics, in particular of polyester, which are capable of absorbing the dyestuffs to be transferred. Further suitable recording materials are, for example, papers and the like coated with the abovementioned plastics, in particular polyester.

In the process for transfer of dyestuffs by the sublimation transfer process, the dyestuffs are sublimed or vaporised from the carrier by a brief, for example in the millisecond range, local supply of heat, for example via the heating elements of a thermal printhead, and transferred onto the recording material.

In the sublimation transfer process, the dyestuffs used according to the invention produce deep, yellowish-tinged red to reddish-tinged violet coloured dots or images having very good fastness properties and a low resublimation.

The sublimation temperature of the dyestuff can be determined quickly and easily as follows:

An inert carrier, for example blotting paper or filter paper, is dipped into a solution, for example a 0.25% strength solution, of the dyestuff under investigation in an organic solvent, for example in ethyl acetate. The dipped dyeing thus produced is dried in air. The coloured carrier is heated briefly in the temperature range from 100° to 200° C. on a Kofler hot bench and the dyestuff which sublimes off is transferred onto a polyester film a short distance (less than 1 mm) above this The amount of dyestuff which has migrated over into the polyester film can be determined photometrically. The temperature at which a clear coloration is visually detectable on the film is the sublimation temperature.

EXAMPLE 1

A strip of filter paper (Binzer quality, AA, smooth, about 70 g/m²) is dipped into a solution of 0.25 g of the dyestuff of the formula

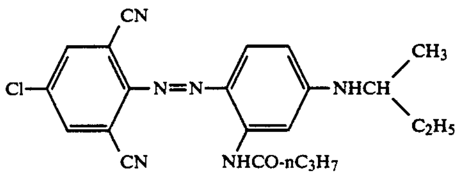
(I)

in 99.75 g Of ethyl acetate for 1 minute and then dried in air. Testing of the thermal sublimation by the process described above shows that sublimation starts at 160° C.

The dyestuff is prepared as follows:

8.5 g of sodium cyanide and 28 g of copper(I) cyanide are introduced in succession into 200 ml of dimethyl sulphoxide at 70° to 75° C. and the mixture is stirred for half an hour. 106 g of the dibromo precursor of the formula II, in which X and Hal denote bromine, $R^1$ denotes chlorine, $R^2$ denotes n-propyl, $R^3$ denotes methyl and $R^4$ denotes ethyl, are then introduced at the same temperature, and the mixture is heated to 110° to 112° C., cooled slowly and filtered at 30° C. After the residue has been washed with 50 ml of dimethyl sulphoxide, 7.5% strength aqueous ammonia and water and dried to constant weight, 64 g of the dyestuff, which dissolves in ethyl acetate to give a red-coloured solution, are obtained.

The other dyestuffs according to the invention and used according to the invention are prepared analogously.

EXAMPLE 2

Testing of the thermal sublimation of a dip dyeing on paper, prepared as described in Example 1, using the dyestuff of the formula

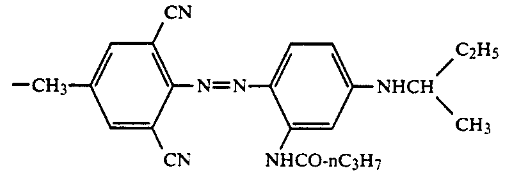

shows that sublimation starts at 160° C.

EXAMPLE 3

Testing of the thermal sublimation of a dip dyeing on paper, as described in Example 1, using the dyestuff of the formula

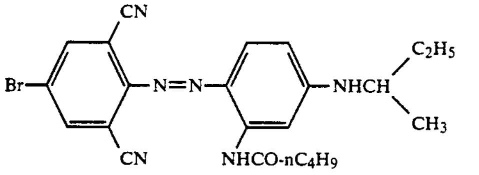

shows that sublimation starts at 165° C.

EXAMPLE 4

10 parts by weight of the dyestuff of Example 1 are processed to a homogeneous printing ink with 10 parts by weight of cellulose acetate and 80 parts by weight of MEK (methyl ethyl ketone), and this paste is drawn onto paper using a 6 μm doctor blade and dried.

The transfer carrier prepared in this way is brought with its colour layer side into contact with the recording material and a recording is transferred using a customary heating head on the reverse of the transfer carrier. 8 dots/mm are transferred within 8 msec at an electrical output of 0.25 watt/heating element.

The resulting recording of a bluish-tinged red colour is clear and distinct and has outstanding fastnesses.

Further dyestuffs used according to the invention having a similarly good sublimation behaviour and good fastness level are listed in the following table. If no further information, such as, for example, i- or sec.-, is given for the radicals stated, these are normal, unbranched radicals. The dyestuffs are prepared by a process analogous to the preparation process described in Example 1.

In the table, the shade obtained on polyester-coated paper in the sublimation transfer process is stated in the last column. The data used here denote:

1 = bluish-tinged red
2 = red
3 = yellowish-tinged red
4 = reddish-tinged violet

TABLE

Dyestuffs of the formula I

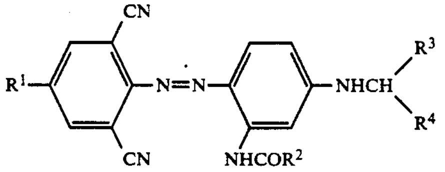

(I)

| Example No. | $R^1$ | $R^2$ | $R^3$ | $R^4$ | Shade |
|---|---|---|---|---|---|
| 01 | Cl | n-$C_4H_9$ | $CH_3$ | $C_2H_5$ | 1 |
| 02 | Cl | i-$C_3H_7$ | $CH_3$ | $C_2H_5$ | 1 |
| 03 | Cl | $CH(CH_3)C_2H_5$ | $CH_3$ | $C_2H_5$ | 1 |
| 04 | Cl | $CH_2CH(CH_3)_2$ | $CH_3$ | $C_2H_5$ | 1 |
| 05 | Cl | n-$C_5H_{11}$ | $CH_3$ | $C_2H_5$ | 1 |
| 06 | Cl | $CH(CH_3)C_3H_7$ | $CH_3$ | $C_2H_5$ | 1 |
| 07 | Cl | $CH(CH_2CH_3)_2$ | $CH_3$ | $C_2H_5$ | 1 |
| 08 | Cl | $CH(C_2H_5)C_4H_9$ | $CH_3$ | $C_2H_5$ | 1 |
| 09 | Cl | $CH_3$ | $C_2H_5$ | $C_2H_5$ | 1 |
| 10 | Cl | i$C_3H_7$ | $C_2H_5$ | $C_2H_5$ | 1 |
| 11 | Cl | n-$C_4H_9$ | $C_2H_5$ | $C_2H_5$ | 1 |
| 12 | Cl | $C(CH_3)_3$ | $C_2H_5$ | $C_2H_5$ | 1 |
| 13 | Cl | n-$C_3H_7$ | $CH_3$ | $CH_3$ | 1 |
| 14 | Cl | n-$C_5H_{11}$ | $CH_3$ | $CH_3$ | 1 |
| 15 | Cl | $CH(C_2H_5)C_4H_9$ | $CH_3$ | n-$C_3H_7$ | 1 |
| 16 | Cl | n-$C_3H_7$ | $CH_3$ | n-$C_3H_7$ | 1 |
| 17 | Cl | i-$C_3H_7$ | $CH_3$ | n-$C_3H_7$ | 1 |
| 18 | Cl | n-$C_3H_7$ | $CH_3$ | n-$C_4H_9$ | 1 |
| 19 | Cl | $CH_3$ | $CH_3$ | n-$C_4H_9$ | 1 |
| 20 | Cl | i-$C_3H_7$ | $CH_3$ | n-$C_4H_9$ | 1 |
| 21 | Cl | n-$C_4H_9$ | $CH_3$ | n-$C_4H_9$ | 1 |
| 22 | Cl | $C_2H_5$ | $C_2H_5$ | n-$C_3H_7$ | 1 |
| 23 | Cl | i-$C_3H_7$ | $C_2H_5$ | n-$C_4H_9$ | 1 |
| 24 | Cl | i-$C_4H_9$ | $C_2H_5$ | n-$C_4H_9$ | 1 |
| 25 | Cl | n-$C_3H_7$ | n-$C_3H_7$ | n-$C_3H_7$ | 1 |
| 26 | Cl | $C_2H_5$ | n-$C_3H_7$ | n-$C_4H_9$ | 1 |
| 27 | Cl | $CH_3$ | n-$C_4H_9$ | n-$C_4H_9$ | 1 |
| 28 | Cl | $C_2H_5$ | $CH_3$ | i-$C_3H_7$ | 1 |
| 29 | Cl | n-$C_3H_7$ | $CH_3$ | i-$C_3H_7$ | 1 |
| 30 | Cl | n-$C_4H_9$ | $CH_3$ | i-$C_3H_7$ | 1 |
| 31 | Cl | i-$C_3H_7$ | $CH_3$ | i-$C_4H_9$ | 1 |
| 32 | Cl | i-$C_4H_9$ | $C_2H_5$ | i-$C_4H_9$ | 1 |
| 33 | Cl | $C_2H_5$ | $CH_3$ | sec.$C_4H_9$ | 1 |
| 34 | Br | $CH_3$ | $CH_3$ | n-$C_4H_9$ | 4 |
| 35 | Br | $CH_3$ | $C_2H_5$ | $C_2H_5$ | 4 |
| 36 | Br | $C_2H_5$ | $CH_3$ | $C_2H_5$ | 4 |
| 37 | Br | $C_2H_5$ | $C_2H_5$ | i-$C_3H_7$ | 4 |
| 38 | Br | n-$C_3H_7$ | $CH_3$ | $C_2H_5$ | 4 |
| 39 | Br | n-$C_3H_7$ | $C_2H_5$ | $C_2H_5$ | 4 |
| 40 | Br | n-$C_3H_7$ | $CH_3$ | $CH_3$ | 4 |
| 41 | Br | n-$C_3H_7$ | $CH_3$ | n-$C_3H_7$ | 4 |
| 42 | Br | i-$C_3H_7$ | $CH_3$ | $C_2H_5$ | 4 |
| 43 | Br | i-$C_3H_7$ | $CH_3$ | n-$C_4H_9$ | 4 |
| 44 | Br | n-$C_4H_9$ | $CH_3$ | $CH_3$ | 4 |
| 45 | Br | n-$C_4H_9$ | $C_2H_5$ | $C_2H_5$ | 4 |
| 46 | Br | $CH_2CH(CH_3)_2$ | $CH_3$ | $C_2H_5$ | 4 |
| 47 | Br | $CH(CH_3)C_2H_5$ | $CH_3$ | $C_2H_5$ | 4 |
| 48 | Br | n-$C_5H_{11}$ | $CH_3$ | $CH_3$ | 4 |
| 49 | Br | n-$C_6H_{13}$ | n-$C_3H_7$ | n-$C_3H_7$ | 4 |
| 50 | Br | n-$C_5H_{11}$ | n-$C_3H_7$ | n-$C_3H_7$ | 4 |
| 51 | F | $C_2H_5$ | $CH_3$ | n-$C_3H_7$ | 2 |
| 52 | F | n-$C_3H_7$ | $CH_3$ | $C_2H_5$ | 2 |
| 53 | F | n-$C_3H_7$ | $C_2H_5$ | $C_2H_5$ | 2 |
| 54 | F | i-$C_3H_7$ | $C_2H_5$ | $C_2H_5$ | 2 |
| 55 | F | n-$C_4H_9$ | $CH_3$ | n-$C_3H_7$ | 2 |
| 56 | F | n-$C_5H_{11}$ | $C_2H_5$ | n-$C_4H_9$ | 2 |
| 57 | $OCH_3$ | $C_2H_5$ | $C_2H_5$ | $C_2H_5$ | 3 |
| 58 | $OCH_3$ | n-$C_3H_7$ | $CH_3$ | $C_2H_5$ | 3 |
| 59 | $OCH_3$ | n-$C_3H_7$ | $CH_3$ | n-$C_4H_9$ | 3 |

TABLE-continued

Dyestuffs of the formula I

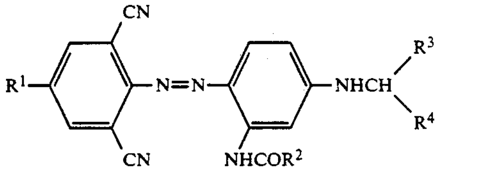

(I)

| Example No. | $R^1$ | $R^2$ | $R^3$ | $R^4$ | Shade |
|---|---|---|---|---|---|
| 60 | $OCH_3$ | $i-C_3H_7$ | $C_2H_5$ | $n-C_4H_9$ | 3 |
| 61 | $OCH_3$ | $n-C_4H_9$ | $C_2H_5$ | $C_2H_5$ | 3 |
| 62 | $OCH_3$ | $n-C_5H_{11}$ | $CH_3$ | $C_2H_5$ | 3 |
| 63 | $OC_2H_5$ | $CH_3$ | $C_2H_5$ | $C_2H_5$ | 3 |
| 64 | $OC_2H_5$ | $C_2H_5$ | $CH_3$ | $C_2H_5$ | 3 |
| 65 | $OC_2H_5$ | $n-C_3H_7$ | $C_2H_5$ | $C_2H_5$ | 3 |
| 66 | $OC_2H_5$ | $n-C_3H_7$ | $CH_3$ | $n-C_4H_9$ | 3 |
| 67 | $O-nC_3H_7$ | $C_2H_5$ | $CH_3$ | $C_2H_5$ | 3 |
| 68 | $O-nC_3H_7$ | $i-C_3H_7$ | $n-C_3H_7$ | $n-C_3H_7$ | 3 |
| 69 | $O-iC_3H_7$ | $n-C_3H_7$ | $CH_3$ | $C_2H_5$ | 3 |
| 70 | $O-iC_3H_7$ | $n-C_4H_9$ | $CH_3$ | $CH_3$ | 3 |
| 71 | $O-nC_4H_9$ | $CH_3$ | $CH_3$ | $n-C_4H_9$ | 3 |
| 72 | $O-nC_4H_9$ | $i-C_3H_7$ | $C_2H_5$ | $C_2H_5$ | 3 |
| 73 | $O-iC_4H_9$ | $i-C_3H_7$ | $CH_3$ | $C_2H_5$ | 3 |
| 74 | $O-sec.C_4H_9$ | $C_2H_5$ | $CH_3$ | $CH_3$ | 3 |
| 75 | $O-tertC_4H_9$ | $CH_3$ | $C_2H_5$ | $C_2H_5$ | 2 |
| 76 | $CF_3$ | $n-C_3H_7$ | $CH_3$ | $C_2H_5$ | 2 |
| 77 | $CF_3$ | $i-C_3H_7$ | $CH_3$ | $i-C_3H_7$ | 2 |
| 78 | $CF_3$ | $CH(C_2H_5)C_4H_9$ | $CH_3$ | $C_2H_5$ | 2 |
| 79 | $CH_3$ | $CH_3$ | $C_2H_5$ | $C_2H_5$ | 3 |
| 80 | $CH_3$ | $C_2H_5$ | $C_2H_5$ | $C_2H_5$ | 3 |
| 81 | $CH_3$ | $C_2H_5$ | $CH_3$ | $n-C_4H_9$ | 3 |
| 82 | $CH_3$ | $n-C_3H_7$ | $CH_3$ | $C_3H_7$ | 3 |
| 83 | $CH_3$ | $i-C_3H_7$ | $CH_3$ | $n-C_3H_7$ | 3 |
| 84 | $CH_3$ | $n-C_4H_9$ | $C_2H_5$ | $C_2H_5$ | 3 |
| 85 | $CH_3$ | $n-C_6H_{13}$ | $CH_3$ | $C_2H_5$ | 3 |
| 86 | $CH_3$ | $CH(C_2H_5)C_4H_9$ | $CH_3$ | $CH_3$ | 3 |
| 87 | $CH_3$ | $n-C_3H_7$ | $CH_3$ | $CH_3$ | 3 |
| 88 | $C_2H_5$ | $C_2H_5$ | $C_2H_5$ | $C_2H_5$ | 3 |
| 89 | $C_2H_5$ | $C_2H_5$ | $n-C_3H_7$ | $n-C_3H_7$ | 3 |
| 90 | $C_2H_5$ | $n-C_3H_7$ | $CH_3$ | $CH_3$ | 3 |
| 91 | $C_2H_5$ | $n-C_3H_7$ | $CH_3$ | $C_2H_5$ | 3 |
| 92 | $C_2H_5$ | $n-C_4H_9$ | $CH_3$ | $n-C_4H_9$ | 3 |
| 93 | $C_2H_5$ | $n-C_4H_9$ | $CH_3$ | $C_2H_5$ | 3 |
| 94 | $C_2H_5$ | $n-C_5H_{11}$ | $CH_3$ | $CH_3$ | 3 |
| 95 | $n-C_3H_7$ | $n-C_3H_7$ | $C_2H_5$ | $C_2H_5$ | 3 |
| 96 | $i-C_3H_7$ | $i-C_3H_7$ | $CH_3$ | $C_2H_5$ | 3 |
| 97 | $i-C_3H_7$ | $C_2H_5$ | $CH_3$ | $n-C_4H_9$ | 3 |
| 98 | $i-C_3H_7$ | $n-C_3H_7$ | $CH_3$ | $n-C_3H_7$ | 3 |
| 99 | $n-C_4H_9$ | $n-C_3H_7$ | $n-C_3H_7$ | $n-C_3H_7$ | 3 |
| 100 | $i-C_4H_9$ | $i-C_4H_9$ | $C_2H_5$ | $C_2H_5$ | 3 |
| 101 | $sec.C_4H_9$ | $n-C_4H_9$ | $CH_3$ | $C_2H_5$ | 3 |
| 102 | $sec.C_4H_9$ | $C_2H_5$ | $CH_3$ | $n-C_3H_7$ | 3 |
| 103 | $tert.C_4H_9$ | $CH_3$ | $CH_3$ | $nC_3H_7$ | 3 |
| 104 | $2-C_5H_{11}$ | $C_2H_5$ | $CH_3$ | $C_2H_5$ | 3 |
| 105 | $3-C_5H_{11}$ | $n-C_3H$ | $C_2H_5$ | $C_2H_5$ | 3 |
| 106 | $3-C_6H_{13}$ | $C_2H_5$ | $CH_3$ | $CH_3$ | 3 |
| 107 | $CycloC_6H_{11}$ | $CH_3$ | $CH_3$ | $C_2H_5$ | 3 |
| 108 | $CycloC_6H_{11}$ | $C_2H_5$ | $CH_3$ | $CH_3$ | 3 |

We claim:

1. A process for transferring a dyestuff by sublimation or vaporization from the surface of a carrier to a substrate wherein the dyestuff is a dyestuff of the general formula I

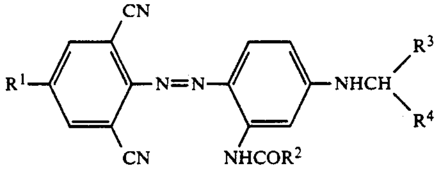

(I)

wherein $R^1$ denotes alkyl having 1 to 6 C atoms, cyclopnetyl, cyclohexyl, fluorine, chlorine, bromine, alkoxy having 1 to 4 C atoms or trifluoromethyl $R^2$ denotes alkyl having 2 to 6 C atoms and $R^3$ and $R^4$ independently of one another denote alkyl having 1 to 4 carbon atoms or a mixture of dyestuffs of the formula I, optically in admixture with other dyestuffs.

2. A process according to claim 1, characterised in that $R^1$ denotes alkyl having 1 to 3 C atoms, alkoxy having 1 to 3 C atoms, chlorine or bromine.

3. A process according to claim 1, characterised in that $R^1$ denotes chlorine or bromine.

4. A process according to claim 1, characterised in that $R^2$ denotes alkyl having 3 or 4 C atoms.

5. A process according to claim 1, characterised in that $R^1$ denotes an alkyl or alkoxy radical and the sum of the carbon atoms in the radicals $R^1$, $R^2$, $R^3$ and $R^4$ is 6 to 11, or in that $R^1$ denotes fluorine, chlorine, bromine or trifluoromethyl and the sum of the carbon atoms in the alkyl radicals represented by $R^2$, $R^3$ and $R^4$ is 5 to 10.

6. Process for the transfer of dyestuffs from a carrier onto a substrate by application of heat to the carrier while in contact with the substrate wherein a dyestuff of the general formula I

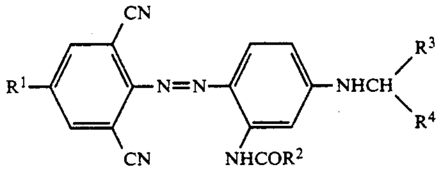

(I)

wherein $R^1$ denotes alkyl having 1 to 6 C atoms, cyclopentyl, cyclohexyl, fluorine, chlorine, bromine, alkoxy having 1 to 4 C aotms or trifluoromethyl, $R^2$ denotes alkyl having 2 to 6 C atoms and $R^3$ and $R^4$ independently of one another denote alkyl having 1 to 4 C atoms, or a mixture of such dyestuffs, optionally in admixture with other dyestuffs, is on the surface of the carrier that is in contact with the substrate and the heating is conducted for a fraction of a second.

7. Process according to claim 6 wherein the substrate is a film of a heatstable plastic cable of absorbing the dyestuff of formula I.

8. Process according to claim 7 wherein the heat-stable plastic is polyester.

9. Process according to claim 6 wherein the substrate is a paper coated with a heat-stable plastic capable of absorbing the dyestuff of formula I.

10. Process according to claim 9 wherein the heat-plastic is polyester.

* * * * *